United States Patent
Morrissey et al.

(10) Patent No.: US 9,755,953 B1
(45) Date of Patent: Sep. 5, 2017

(54) MULTI-PATH ROUTING CONTROL FOR AN ENCRYPTED TUNNEL

(71) Applicant: Rockwell Collins, Inc., Cedar Rapids, IA (US)

(72) Inventors: Patrick J. Morrissey, Cedar Rapids, IA (US); Kesava Srinivas Vunnava, Vijayawada (IN); James N. Potts, Cedar Rapids, IA (US); Justin William Ehm, Cedar Rapids, IA (US); Rhishi Pratap Singh, Kidwai Nagar (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 265 days.

(21) Appl. No.: 14/339,541

(22) Filed: Jul. 24, 2014

(51) Int. Cl.
*H04L 12/707* (2013.01)
*H04L 9/12* (2006.01)

(52) U.S. Cl.
CPC ............. *H04L 45/24* (2013.01); *H04L 9/12* (2013.01); *H04L 2209/12* (2013.01)

(58) Field of Classification Search
None
See application file for complete search history.

(56) References Cited

U.S. PATENT DOCUMENTS

| | | | |
|---|---|---|---|
| 2007/0076599 A1* | 4/2007 | Ayyagari | H04L 9/00 370/229 |
| 2008/0186897 A1* | 8/2008 | Rune | H04L 12/4633 370/315 |

* cited by examiner

*Primary Examiner* — Kaveh Abrishamkar
(74) *Attorney, Agent, or Firm* — Angel N. Gerdzhikov; Donna P. Suchy; Daniel M. Barbieri

(57) ABSTRACT

The present disclosure is directed to a system and method for applying unique routing rules to encrypted data packets being transmitted via a tunneling protocol. Because encrypted data packets are unintelligible at intermediary points along a secured link or "tunnel," a multi-path router located between the tunnel endpoints is typically unable to apply unique routing rules. To enable unique routing, the disclosed method relies on a unique identifier that is associated with the secured link established between an initiator and a receiver (i.e., the tunnel endpoints). The unique identifier is transmitted with one or more encrypted data packets and is used at intermediary points to differentiate the encrypted data packets so that unique routing rules can be applied.

21 Claims, 3 Drawing Sheets

MULTI-PATH ROUTING CONTROL FOR AN ENCRYPTED TUNNEL

FIELD OF INVENTION

The present disclosure relates to encrypted data transmission, and more particularly, to the routing of data within an encrypted tunnel.

BACKGROUND

Tunneling protocols are commonly employed to securely transfer information from one place to another. For example, encrypted data packets may be securely transferred over a secured link that is established between an initiator and a receiver. This secured link is sometimes referred to as a "tunnel" because the encrypted data packets being sent from the initiator to the receiver can only be seen at the endpoints. That is, the contents of encrypted data packets being sent through the tunnel are only intelligible at the initiator and the receiver. Since the data contents (e.g., address, port information, data type, etc.) can only be seen at the endpoints of the tunnel, intermediate routers are prevented from applying unique routing rules.

SUMMARY

In one aspect, the present disclosure is directed to a method of establishing and applying unique routing rules to data being transmitted via a secured link, where the data is partially or totally encrypted. In an embodiment, the method may include the steps of: encrypting one or more data packets for secured transmission from an initiator to a receiver; establishing a secured link between the initiator and the receiver; generating a unique identifier associated with the secured link established between the initiator and the receiver; transmitting information associating the unique identifier with the one or more encrypted data packets to a multi-path router; transmitting data including the one or more encrypted data packets and the unique identifier from the initiator along a portion of the secured link to the multi-path router; establishing one or more routing rules based at least partially upon the unique identifier and the information associating the unique identifier with the one or more encrypted data packets; and directing the transmitted data from the multi-path router to the receiver along at least one communication path selected from a plurality of communication paths between the initiator and the receiver, where the communication path or paths are selected based upon the one or more routing rules.

In another aspect, the present disclosure is directed to a multi-path router enabled to apply unique routing rules to encrypted data packets that are being transferred via a secured link that is established between an initiator and a receiver. The multi-path router may include at least one input port configured to receive transmitted data from the initiator, where the transmitted data includes one or more encrypted data packets destined for the receiver. The transmitted data may further include at least one unique identifier that is associated with the secured link that is established between the initiator and the receiver. The multi-path router may further include at least one output port configured to direct the transmitted data along at least one communication path selected from a plurality of communication paths between the initiator and the receiver. The communication path or paths may be selected based upon one or more routing rules applied by an internal switch in communication with the input and output ports of the multi-path router. At least one processor may be included in or may be in communication with the switch. The processor may configured to receive information associating the unique identifier with the one or more encrypted data packets, and further configured to establish the one or more routing rules based at least partially upon the unique identifier and the information associating the unique identifier with the one or more encrypted data packets.

In yet another aspect, the present disclosure is directed to a communication system with an encrypted tunneling protocol. The communication system may include an initiator in communication with one or more data sources. The communication system may further include a receiver configured to receive data transmitted from the one or more data sources over a secured link that is established between the initiator and the receiver. The transmitted data may include one or more encrypted data packets and at least one unique identifier. A multi-path router may be located along the secured link, in communication with the initiator and the receiver. The multi-path router may be configured to: receive the transmitted data; receive information associating the unique identifier with the one or more encrypted data packets; establish one or more routing rules based at least partially upon the unique identifier and the information associating the unique identifier with the one or more encrypted data packets; and direct the transmitted data along at least one communication path selected from a plurality of communication paths between the initiator and the receiver, where the communication path or paths are selected based upon the one or more routing rules.

It is to be understood that both the foregoing general description and the following detailed description are not necessarily restrictive of the disclosure. The accompanying drawings, which are incorporated in and constitute a part of the specification, illustrate embodiments of the disclosure, wherein like numbers represent like elements or features.

BRIEF DESCRIPTION OF THE DRAWINGS

The embodiments of the disclosure may be better understood by those skilled in the art by reference to the accompanying figures in which.

DETAILED DESCRIPTION

Figure 1A:
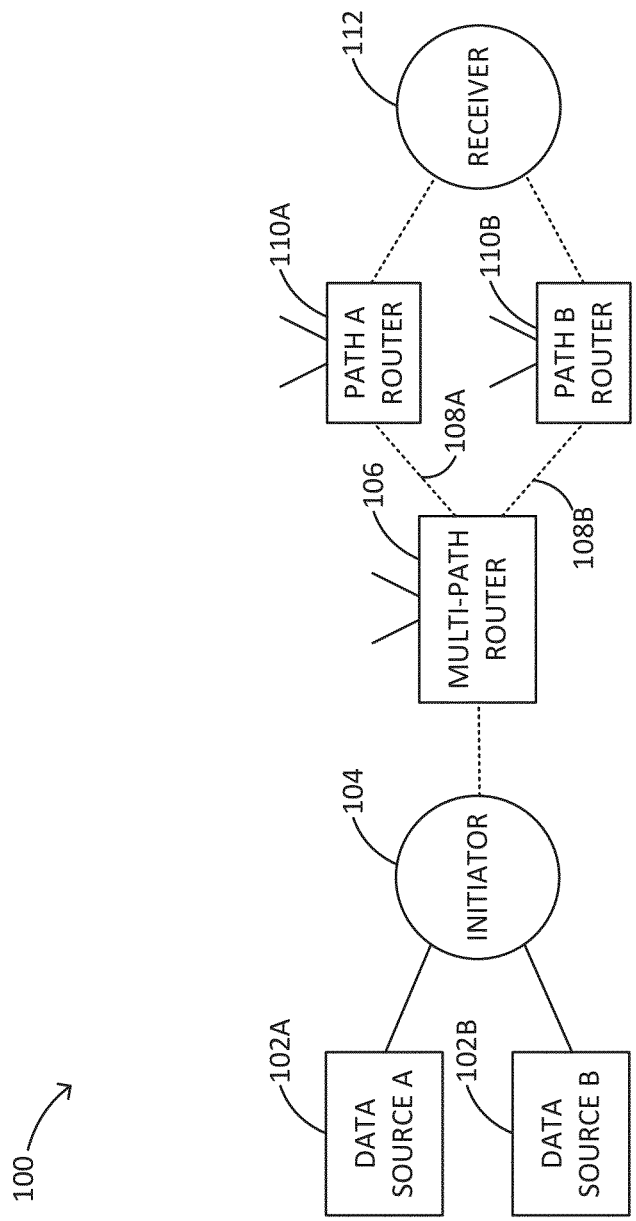
FIG. 1A is a block diagram illustrating a secured communication system, in accordance with an embodiment of the disclosure.

Reference will now be made in detail to the embodiments disclosed, which are illustrated in the accompanying drawings. FIGS. 1A through 2 illustrate embodiments of a system and method for providing unique routing rules for fully or partially encrypted data being transmitted via a secured link between an initiator and a receiver (sometimes referred to herein as tunnel "endpoints"). Tunneling protocols are commonly used to encrypt one or more data packets, thereby encapsulating the one or more data packets within one or more encrypted data packets for secure transmission over a secured link (sometimes referred to herein as an encrypted "tunnel"). A tunneling protocol may conceal the data contents, such as address and port information or data type, of an encrypted data packet from intermediate routers, thus preventing unique routing rules from being applied to different tunnels originating from the same endpoint. Embodiments described herein may enable unique routing rules to be established by proving an intermediate multi-path router with information associating at least a portion of the data contents of the one or more encrypted data packets with an observable unique identifier that is transmitted concurrently with or attached to the one or more encrypted data packets.

FIG. 1A illustrates an embodiment of a communication system 100 including an encrypted tunnel defined by a secured link that is established between at least one initiator 104 and at least one receiver 112 (i.e., the tunnel endpoints). One or more data packets may be received from at least one data source 102 such as, but not limited to, a server, a personal computing system, a mobile device, an audio/visual recorder, or any combination thereof. In some embodiments, at least a first data source 102A and a second data source 102B may be configured to transmit data via the same initiator 104. The initiator 104 may be configured to be configured to encrypt the one or more data packets received from the one or more data sources 102 for transmission via the secured link to the receiver 112. The initiator 104 and/or the receiver 112 may be further configured to generate a unique identifier that is included in at least a portion of an encrypted data packet, attached to one or more encrypted data packets, and/or transmitted concurrently with the one or more encrypted data packets. In some embodiments, the unique identifier is associated with the secured link that is established between the initiator 104 and the receiver 112 or may be generated at the time of encryption and/or establishment of the secured link. The unique identifier may include one or more randomly or pseudo-randomly generated bits or may be selected algorithmically from a plurality of predetermined bit sequences.

The data contents of the one or more encrypted data packets may be unintelligible between the tunnel endpoints, that is, after transmission by the initiator 104 and prior to being received by the receiver 112. The unique identifier, however, may be intelligible to at least one intermediate device, such as a multi-path router 106. In some embodiments, the multi-path router 106 is configured to transmit data, according to one or more routing rules, via at least one of two or more communication paths 108. For example, the multi-path router 106 may be connected to at least a first communication path 108A and a second communication path 108B. In some embodiments, the communication paths 108 may further include single-protocol or multi-path routers, such as a first router 110A for the first communication path 108A and a second router 110B for the second communication path 108B. The various communication paths 108 may have different characteristics. For example, the first communication path 108A may have a first bandwidth or transmission rate and the second communication path 108B may have a second bandwidth or transmission rate that is different from the first. In some embodiments, the level of traffic may vary from one communication path 108 to another. Further, the communication paths 108 may operate according to different communication protocols such as, but not limited to, VHF, SATCOM, or IP connections.

It may be advantageous to transmit certain data types or data coming from a certain data source 102 along a specified communication path 108 or a specified combination of the communication paths 108. For example, it may be desirable to transmit critical information (e.g., aircraft status communications or security alerts) along a high speed communication path or one that has low traffic or is less vulnerable to interruptions or hacks, while general information (e.g., internet browser uploads/downloads) may be transmitted via a slower or less secure communication path. The multi-path router 106 may be configured to establish unique routing rules according to the data type or data source of data packets being sent through the multi-path router 106. To enable the multi-path router 106 to establish unique routing rules for data including one or more encrypted data packets, the initiator 104 and/or the receiver 112 may be configured to send the multi-path router 106 information associating the (observable) unique identifier with the (unintelligible) data contents of the one or more encrypted data packets. For example, the initiator 104 and/or the receiver 112 may be configured to provide the multi-path router 106 with information regarding the data type or the data source 102 (e.g., address and/or port information) of the one or more encrypted data packets.

Figure 1B:
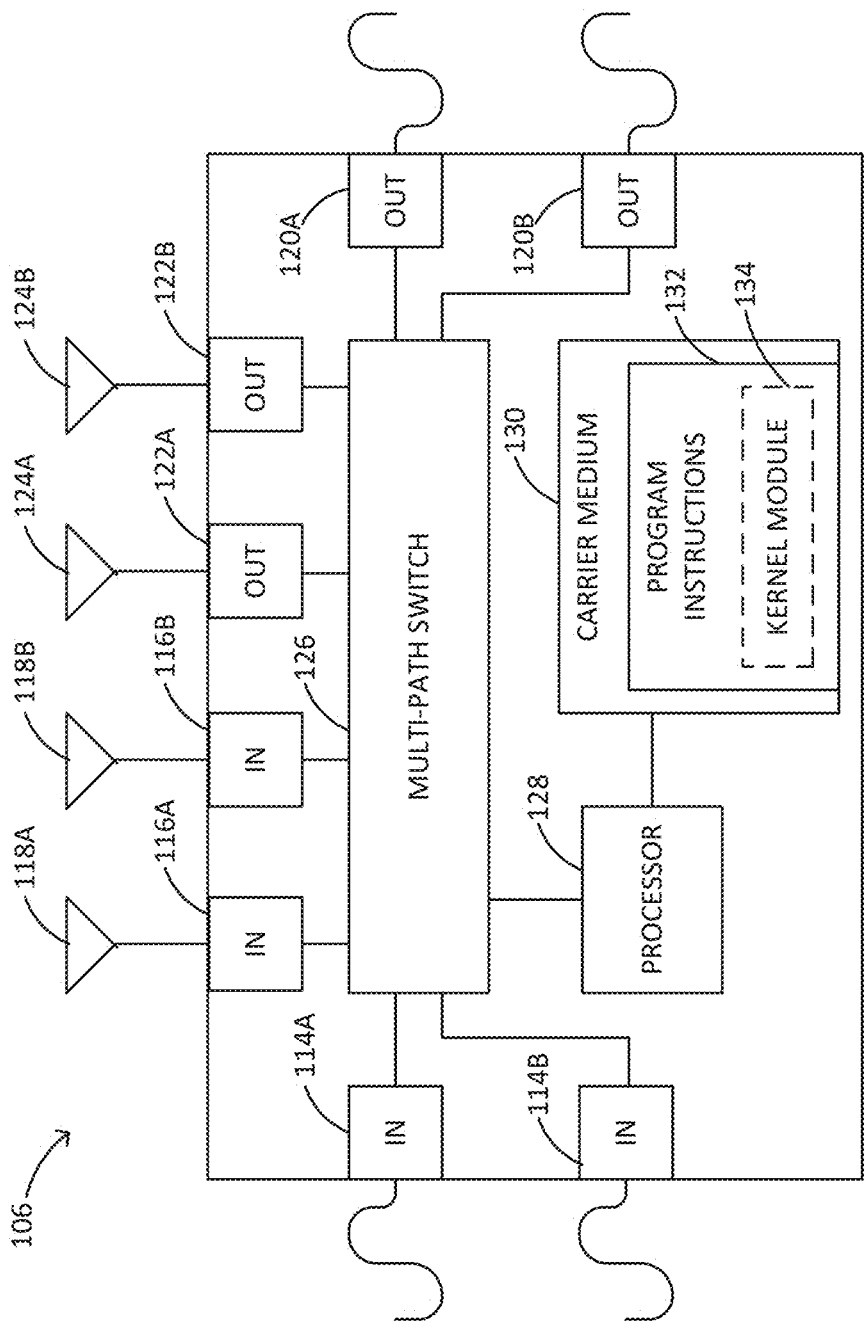
FIG. 1B is a block diagram illustrating a multi-path router enabled to apply unique routing rules to encrypted data being transmitted over a secured link, in accordance with an embodiment of the disclosure.
Figure 2:
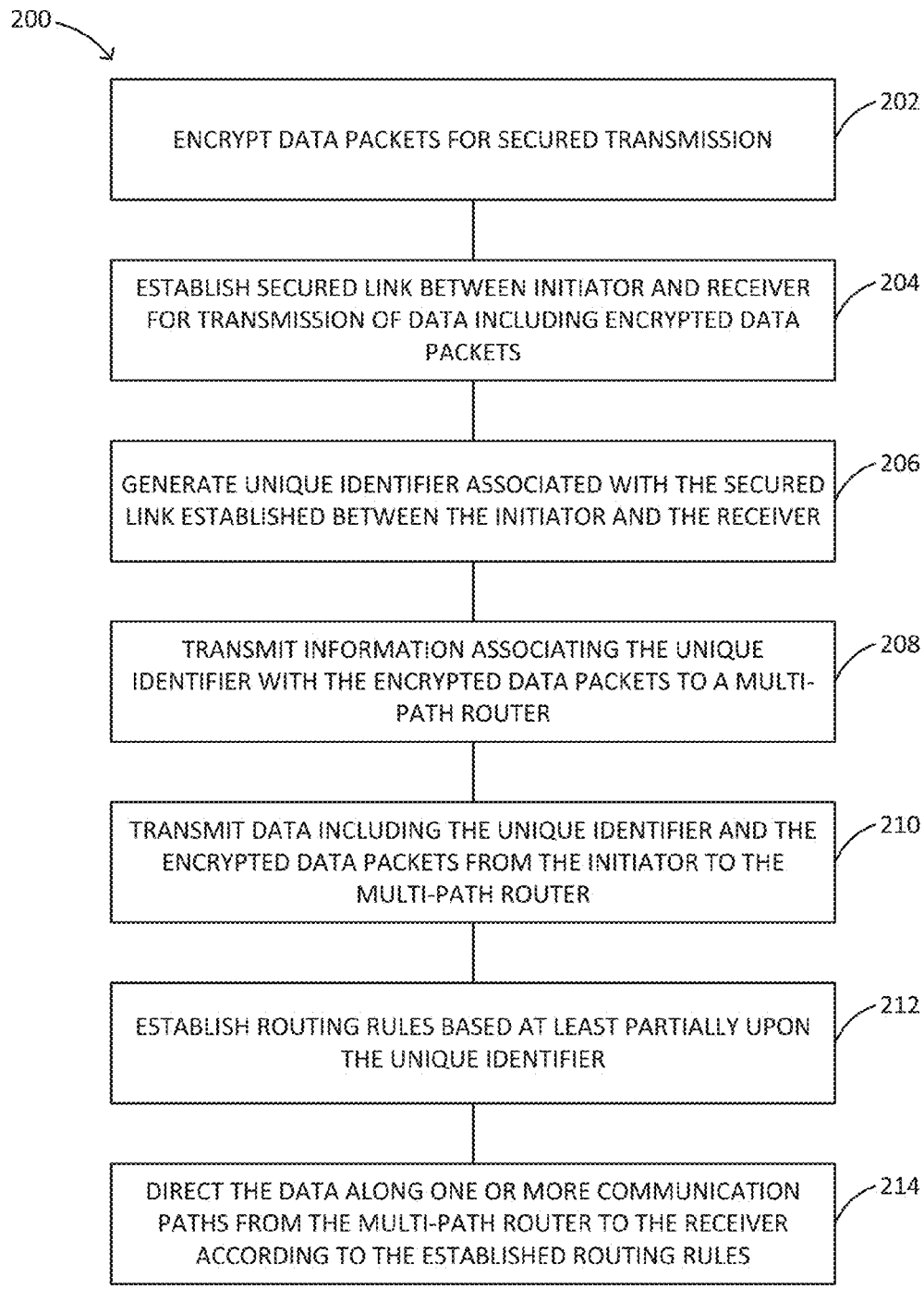
FIG. 2 is a flow diagram illustrating a method of applying unique routing rules to encrypted data being transmitted over a secured link, in accordance with an embodiment of the disclosure.

An embodiment of the multi-path router 106 is illustrated in FIG. 1B. The multi-path router 106 may include one or more wired input communication ports (e.g., ports 114A and 114B) and/or output communication ports (e.g., ports 120A and 120B) such as, but not limited to, Ethernet ports, optical input ports, USB ports, serial ports, or parallel ports. Alternatively or in addition to wired communication ports, the multi-path router 106 may include one or more wireless input communication ports (e.g., ports 116A and 116B coupled with antennas 118A and 118B) and output communication ports (e.g., ports 122A and 122B coupled with antennas 124A and 124B) such as, but not limited to, WIFI or SATCOM, or VHF communication ports. In some embodiments, two or more wireless input ports 116 and/or output ports 122 may share a common antenna (not shown). The multi-path router 106 may further include switch fabric 126 connecting the input ports 114/116 and the output ports 120/122. The switch fabric 126 may be controlled by at least one processor 128 or controller configured to execute program instructions 132 from a non-transitory carrier medium 130.

The program instructions 132 may include one or more software modules and/or instruction sets, such as a kernel module 134 configured to run on the processor 128 or controller. The kernel module 134 may be configured to receive the information associating the unique identifier for one or more encrypted data packets being transmitted via the secured link with the data contents of the one or more encrypted data packets. For example, the kernel module 134 may be configured to receive information regarding the data type of the one or more encrypted data packets and/or the data source 102 of the one or more encrypted data packets. Using this information, the kernel module 134 may be configured to establish unique routing rules for the one or more encrypted data packets which are accompanied by the unique identifier, that is, the unique routing rules may be based upon the (observable) unique identifier and the associated information rather than the actual data contents (which may be unintelligible).

In some embodiments, the unique routing rules may include a directive for the switch fabric 126 to send at least a portion of transmitted data including a first data type and/or originating from a first data source 102A along a first communication path 108A and a directive to send at least a portion of the transmitted data including a second data type and/or originating from a second data source 102B along a second communication path 108B. As discussed above, one or more encrypted data packets making up at least a portion of the transmitted data may be differentiated from other encrypted data packets by the kernel module 134 using the unique identifier accompanying the one or more encrypted data packets. The kernel module 134 may be configured to apply the established routing rules to the one or more encrypted data packets by referencing the information associating the unique identifier with the data contents of the one or more encrypted data packets. For example, where a first unique identifier is associated with one or more encrypted data packets including a first data type and/or originating from a first data source 102A, the kernel module 134 may be configured to establish a routing rule including a directive to send the one or more encrypted data packets accompanying the first unique identifier along a first communication path 108A. In some embodiments, the kernel module 134 may be configured to update a table or database of routing rules by entering rules based upon the unique identifier of each encrypted data packet or set of encrypted data packets.

In an embodiment, dynamic routing rules may be based on a unique identifier included in an observable portion of an internet protocol security (IPSEC) encrypted data packet. During the initialization phase of a tunnel internet security association and key management protocol (ISAKMP), initiator cookies may be passed between two tunnel endpoints, such as initiator 104 and receiver 112, to relate their identities and setup the tunnel. During this phase, the multi-path router 106 can read the initiator and responder cookies to determine proper routing of the packets. Once the ISAKMP exchange is completed the IPSEC clients may establish a security association (SA). The SA may be composed of the routable IP representing each endpoint and a unique identifier, such as security parameter index (SPI), for each endpoint. Though the original packet is encrypted, the SPI associated with the connection may be observable in the encrypted packet. An application running on the endpoint where the connection is initialized can update intermediate routers, such as multi-path router 106, with information for establishing unique routing rules based on the unique SPI of the tunnel endpoint, thereby allowing unique routing rules to be applied per tunnel.

FIG. 2 illustrates a method 200 of establishing unique routing rules for transmission of data including one or more encrypted data packets. In some embodiments, method 200 may be manifested by an embodiment of system 100. However, method 200 is not restricted to the embodiments of system 100 described above. The method 200 may be manifested by any system configured to perform the following steps.

At step 202, at least a portion of data may be encrypted for transmission via a secured link. In some embodiments, one or more data packets are encrypted for secured transmission between an initiator 104 and a receiver 112. At step 204, a secured link may be established between the initiator 104 and the receiver 112. At step 206, a unique identifier may be generated for the one or more encrypted data packets. The unique identifier may be generated randomly or pseudo-randomly or may be algorithmically selected from a plurality of predetermined bit sequences. In some embodiments, steps 202, 204, and/or 206 may be performed concurrently. For example, the secured link between the initiator 104 and the receiver 112 may be established at the time of encryption of the one or more data packets. The unique identifier may be generated during the encryption phase and, in some embodiments, may be included in the one or more encrypted data packets encapsulating the one or more original data packets. In some embodiments, the secured link is established between the initiator 104 and the receiver 112 prior to the encryption phase.

At step 208, information associating the unique identifier with the one or more encrypted data packets may be transmitted to a multi-path router 106. For example, the initiator 104 and/or the receiver 112 may transmit information regarding the data type or the data source of the one or more encrypted data packets to the multi-path router 106. At step 210, at least a portion of data including the one or more encrypted data packets may be transmitted from the initiator to the multi-path router 106. The one or more encrypted data packets may include or may be accompanied by the unique identifier.

At step 212, unique routing rules may be established for at least a portion of the data including the one or more encrypted data packets. The unique routing rules may be established at the multi-path router 106 before or after the multi-path router 106 receives the encrypted data packets. In some embodiments, for example, the unique routing rules may be established when the multi-path router 106 receives the information associating the unique identifier with the one or more encrypted data packets (i.e., before the one or more encrypted data packets are transmitted to the multi-path router 106). The unique routing rules may be at least partially based upon the unique identifier for the one or more encrypted data packets and the information associating the unique identifier with the one or more encrypted data packets (e.g., information regarding the data type or data source of the one or more encrypted data packets).

At step 214, the one or more encrypted data packets may be directed, according to the established routing rules, from the multi-path router 106 along at least one of two or more communication paths. For example, at least a portion of data including a first data type and/or originating from a first data source may be transmitted along a first communication path and at least a portion of data including a second data type and/or originating from a second data source may be transmitted along a second communication path. One or more encrypted data packets in at least a portion of data may be directed according the unique routing rules by referencing the routing rules and/or information associated with the unique identifier for the one or more encrypted data packets. For example, at step 212, routing rules may be specified for a unique identifier based upon the information associating the unique identifier with the one or more encrypted data packets. Alternatively, routing rules may be applied to one or more encrypted data packets by referencing the information associating the one or more encrypted data packets with the unique identifier. In either case, routing rules may be (directly or indirectly) established for the one or more encrypted data packets based at least partially upon the unique identifier and the information associating the one or more encrypted data packets with the unique identifier.

Those skilled in the art will appreciate that the steps described herein may be performed in varying order and/or at least partially in concurrence with one another without departing from the scope of this disclosure. It should be further recognized that the various functions, operations, or steps described throughout the present disclosure may be carried out by any combination of hardware, software, or firmware. In some embodiments, various steps or functions are carried out by one or more of the following: electronic circuitry, logic gates, multiplexers, a programmable logic device, an application-specific integrated circuit (ASIC), a controller/microcontroller, or a computing system. A computing system may include, but is not limited to, a personal computing system, mainframe computing system, workstation, image computer, parallel processor, or any other device known in the art. In general, the terms "controller" and "computing system" are broadly defined to encompass any device having one or more processors, which execute instructions from a carrier medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a non-transitory signal bearing medium or storage medium such as, but not limited to, a read-only memory, a random access memory, a magnetic or optical disk, a solid-state or flash memory device, or a magnetic tape.

It is further contemplated that any embodiment of the disclosure manifested above as a system or method may include at least a portion of any other embodiment described herein. Those having skill in the art will appreciate that there are various embodiments by which systems and methods described herein can be implemented, and that the implementation will vary with the context in which an embodiment of the disclosure is deployed. Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A multi-path router, comprising:
   at least one input port configured to receive transmitted data from an initiator, the transmitted data including one or more encrypted data packets destined for a receiver coupled with the initiator via a single secured link, the transmitted data further including a unique identifier associated with the single secured link, wherein when the single secured link is initialized, initiator cookies are passed between the initiator and the receiver to relate their identities and setup the single secured link along with creating a security association, the security association including routable IP representing the initiator and the receiver along with the unique identifier;
   at least one processor configured to receive information associating the unique identifier with the one or more encrypted data packets, wherein the one or more encrypted data packets include data which is encrypted an not observable for said at least one processor except for the unique identifier, said at least one processor further configured to establish one or more routing rules based at least partially upon the unique identifier and the information associating the unique identifier with the one or more encrypted data packets, the one or more routing rules include a directive to transfer at least a portion of the transmitted data along at least one communication path; and
   at least one output port configured to direct at least the portion of the transmitted data along the at least one communication path selected from a plurality of communication paths between the initiator and the receiver within the single secured link based upon the unique identifier and the one or more routing rules.

2. The multi-path router of claim 1, wherein the information associating the unique identifier with the one or more encrypted data packets includes at least one of information identifying a data type of the one or more encrypted data packets or information identifying a data source of the one or more encrypted data packets.

3. The multi-path router of claim 1, wherein the plurality of communication paths includes at least a first communication path and a second communication path.

4. The multi-path router of claim 3, wherein the first communication path employs a first communication protocol, and the second communication path employs a second communication protocol that is different from the first communication protocol.

5. The multi-path router of claim 3, wherein the first communication path has a first transmission rate, and the second communication path has a second transmission rate that is different from the first transmission rate.

6. The multi-path router of claim 3, wherein the one or more routing rules include a directive to send at least a portion of the transmitted data including a first data type along the first communication path and a directive to send at least a portion of the transmitted data including a second data type along the second communication path.

7. The multi-path router of claim 3, wherein the one or more routing rules include a directive to send at least a portion of the transmitted data originating from a first data source along the first communication path and a directive to send at least a portion of the transmitted data originating from a second data source along the second communication path.

8. A communication system, comprising:
   an initiator in communication with one or more data sources;
   a receiver configured to receive data that is transmitted from the one or more data sources over a single secured link between the initiator and the receiver, wherein when the single secured link is initialized, initiator cookies are passed between the initiator and the receiver to relate their identities and setup the single secured link along with creating a security association, the security association including routable IP representing the initiator and the receiver along with a unique identifier, the transmitted data including one or more encrypted data packets and a unique identifier, the one or more encrypted data packets being unintelligible after transmission by the initiator and prior to being received by the receiver; and
   a multi-path router in communication with the initiator and the receiver, the multi-path router being configured to:
      receive the transmitted data;
      receive information associating the unique identifier with the one or more encrypted data packets;
      establish one or more routing rules based at least partially upon the unique identifier and the information associating the unique identifier with the one or more encrypted data packets, the one or more routing rules include a directive to transfer at least a portion of the transmitted data along at least one communication path; and
      direct the transmitted data along the at least one communication path selected from a plurality of communication paths between the initiator and the receiver within the single secured link, the at least one communication path being selected based upon the unique identifier and the one or more routing rules.

9. The communication system of claim 8, wherein the information associating the unique identifier with the one or more encrypted data packets includes at least one of information identifying a data type of the one or more encrypted data packets or information identifying a data source of the one or more encrypted data packets.

10. The communication system of claim 8, wherein the plurality of communication paths includes at least a first communication path and a second communication path.

11. The communication system of claim 10, wherein the first communication path employs a first communication protocol having a first transmission rate, and the second communication path employs a second communication protocol having a second transmission rate.

12. The communication system of claim 10, wherein the unique identifier comprises a randomly generated sequence, the randomly generated sequence being associated with the secured link established between the initiator and the receiver.

13. The communication system of claim 10, wherein the one or more routing rules include a directive to send at least a portion of the transmitted data including a first data type along the first communication path and a directive to send at least a portion of the transmitted data including a second data type along the second communication path.

14. The communication system of claim 10, wherein the one or more routing rules include a directive to send at least a portion of the transmitted data originating from a first data source along the first communication path and a directive to send at least a portion of the transmitted data originating from a second data source along the second communication path.

15. The communication system of claim 8, wherein the unique identifier associated with the one or more encrypted data packets includes a security parameter index associated with an endpoint.

16. A method of routing data through an encrypted tunnel, comprising:
    encrypting one or more data packets for secured transmission from an initiator to a receiver;
    establishing a single secured link between the initiator and the receiver;
    generating a unique identifier associated with the secured link established between the initiator and the receiver, wherein when the single secured link is initialized, initiator cookies are passed between the initiator and the receiver to relate their identities and setup the single secured link along with creating a security association, the security association including routable IP representing the initiator and the receiver along with the unique identifier;
    transmitting information associating the unique identifier with the one or more encrypted data packets to a multi-path router;
    transmitting data including the one or more encrypted data packets and the unique identifier from the initiator along a portion of the secured link to the multi-path router;
    establishing one or more routing rules based at least partially upon the unique identifier and the information associating the unique identifier with the one or more encrypted data packets, the one or more routing rules include a directive to transfer at least a portion of the transmitted data along at least one communication path; and
    directing the transmitted data from the multi-path router to the receiver along the at least one communication path selected from a plurality of communication paths between the initiator and the receiver within the single secured link, the at least one communication path being selected based upon the unique identifier and the one or more routing rules.

17. The method of claim 16, wherein the information associating the unique identifier with the one or more encrypted data packets includes at least one of information identifying a data type of the one or more encrypted data packets or information identifying a data source of the one or more encrypted data packets.

18. The method of claim 16, wherein the one or more routing rules include a directive to send a first portion of the transmitted data along a first communication path and a directive to send a second portion of the transmitted data along a second communication path.

19. The method of claim 18, wherein the first communication path has a first transmission rate, and the second communication path has a second transmission rate that is different from the first transmission rate.

20. The method of claim 18, wherein the first communication path employs a first communication protocol, and the second communication path employs a second communication protocol that is different from the first communication protocol.

21. The method of claim 18, wherein the directives are based upon at least one of a data type included in each portion of the transmitted data or a data source of each portion of the transmitted data.

* * * * *